Patented Apr. 5, 1927.

1,623,517

UNITED STATES PATENT OFFICE.

GEORGE WILSON ACHESON, OF NEWARK, NEW JERSEY.

PROCESS OF PREPARING RUBBER COMPOSITIONS.

No Drawing.  Application filed April 21, 1923. Serial No. 633,786.

This invention relates to the preparation of compositions comprising rubber in intimate association with a filling material such as clay, zinc oxid, carbon black or the like; and comprises a novel process whereby such mixtures may be prepared economically and of excellent quality. My novel process is characterized by the employment of a collodial or deflocculated filler, which is admixed with rubber latex, the mixture being thereafter treated with a suitable agent, usually an electrolyte, which is capable of effecting simultaneously the flocculation of the filler and the precipitation of the rubber component of the latex. By this procedure I have been able to prepare compositions in which the intimacy of the admixture is such as to confer upon them properties which are novel in mixtures of this type. In particular I am able to incorporate large proportions of the filler, say up to 70% or more by weight of the composition, while retaining in unusual degree the elastic character of the mixture.

Following is a preferred procedure in accordance with my invention, but it is to be understood that the invention is not limited to the operating details as therein set forth for purposes of illustration.

I first effect the deflocculation of the filling material, preferably clay, gas-black, or washed zinc oxid, by means of an organic deflocculating agent. I accomplish this by means now well understood in this art, and preferably in accordance with the prior patents and published disclosures of E. G. Acheson. The deflocculating agents above referred to comprise tannin and tannin-like bodies, and other organic bodies and products capable of producing similar effects. Certain methods of deflocculating solid bodies and utilizing the resulting deflocculated products are disclosed in the prior U. S. patents to E. G. Acheson, Numbers 722,791; 843,426; 844,989; 875,881; 895,063; 911,358; 931,832; 964,478; 966,636; 986,793; 1,030,372; 1,082,386; 1,201,994; 1,223,350. Deflocculation, as the term is used herein, involves the mechanical working of the material in the form of a heavy paste in conjunction with certain organic bodies such as tannin, extracts from roasted cereals, or other organic bodies having like properties and known as "deflocculating agents". The operation is facilitated by the addition of ammonia, or amino bodies such as hexamethylenetetramine.

The filling material is first deflocculated in accordance with the known methods, the immediate product of this operation being a heavy water-bearing paste, the solid component of which exists partially or wholly in the deflocculated state,—that is, is permanently suspensible upon dilution of the paste by pure water, and exists in the so-called collodial state, being re-precipitated by the addition of small proportions of electrolytes. It is not necessary for the purposes of this invention that the solid material should be wholly deflocculated, although in the case of such readily deflocculatable materials as gas-black and clay it is practicable to secure substantially complete deflocculation in a single operation, and this is the preferred procedure in such cases. It is desirable however to remove grit and coarse particles of whatever kind.

The paste is diluted by pure water until it carries about 10% of clay or other filler in suspension, and is then run through a Dorr thickener or other suitable classifying device to remove grit and coarse particles.

The precise amount of suspended matter carried by the effluent is determined, and there is then uniformly admixed therewith sufficient fluid rubber latex to provide the desired proportions between the filler and rubber components of the mixture. The mixture is thoroughly agitated, and should preferably be allowed to stand for some hours to permit blending, which I have found to be essential for the highest quality in the product.

I then add a suitable electrolyte, preferably hydrochloric acid, in proportion to impart a distinct acidity to the mixture, and agitate thoroughly. Upon standing, the filler undergoes flocculation and the rubber coagulates, the two separating, where the blending has been properly performed, in the most intimate association.

After settling the water is decanted, and the curd-like product is collected on a filter, and then sheeted between rollers, whereby any residual water is expelled. Heated rolls may be used.

Where sulfur is to be introduced into the composition with a view to subsequent vulcanization, I preferably deflocculate it under the same conditions as the clay or other filler, and either simultaneously with the filler or in a separate operation, and add the resulting deflocculated suspension of sulfur to the clay-latex mixture before flocculating the latter.

The particular deflocculating agent which I now prefer to employ comprises roasted wheat extracted with an ammoniacal solution. The latex is also commonly stabilized by ammonia as a preliminary to its shipment from the rubber-producing localities; and it is probable that during the blending operation described above some interaction may occur between the several components, the nature of which is not now understood, but which may perhaps involve a further deflocculation of the filling material. My invention is not however limited by such considerations.

I claim:

1. Process of preparing a rubber composition comprising commingling rubber latex with an aqueous suspension of a deflocculated solid, and simultaneously flocculating the solid and coagulating the rubber, whereby a curd-like precipitate containing rubber and filler in intimate admixture is formed.

2. Process of preparing a rubber composition comprising commingling rubber latex with aqueous suspensions of a deflocculated rubber filler and sulfur, and simultaneously flocculating the filler and coagulating the rubber, whereby a curd-like precipitate containing rubber, filler, and sulfur in intimate admixture is formed.

3. Process according to claim 2 in which the rubber latex is commingled with deflocculated rubber-filler and deflocculated sulfur.

4. Process according to claim 1 in which the latex and deflocculated filler are subjected to thorough blending before the precipitation.

In testimony whereof, I affix my signature.

GEORGE WILSON ACHESON.